United States Patent [19]

Aubel et al.

[11] Patent Number: 5,183,087
[45] Date of Patent: Feb. 2, 1993

[54] REFUELING VAPOR RECOVERY SYSTEM

[75] Inventors: John A. Aubel, Chandler, Ariz.;
Jeffrey E. Devall, South Bend, Ind.;
David R. Gimby, Livonia; Philip A.
Shipp, Rochester, both of Mich.

[73] Assignee: Borg-Warner Automotive Electronic
& Mechanical Systems Corporation,
Sterling Heights, Mich.

[21] Appl. No.: 713,402

[22] Filed: Jun. 10, 1991

[51] Int. Cl.$^5$ .............................................. F16K 24/04
[52] U.S. Cl. ...................................... 141/59; 141/44;
141/312; 141/369; 141/372; 123/518; 137/589;
137/43; 137/39; 220/748; 220/86.1
[58] Field of Search ..................... 141/59, 312, 44-46,
141/287, 367, 368, 369, 370, 372; 123/518-521;
137/587-589, 39, 43; 220/86.2, 86.1, 89.1, 748

[56] References Cited

U.S. PATENT DOCUMENTS

| | | |
|---|---|---|
| 252,958 | 1/1882 | McDonnell . |
| 1,363,263 | 12/1920 | Ohliger et al. . |
| 2,352,898 | 7/1944 | Hill . |
| 2,396,233 | 3/1946 | Abrams . |
| 2,845,937 | 8/1958 | Ksieski . |
| 2,989,062 | 6/1960 | Gruget . |
| 3,059,661 | 10/1962 | Benmore . |
| 3,141,469 | 7/1964 | Stradella . |
| 3,500,843 | 3/1970 | White . |
| 3,545,465 | 12/1970 | Zadoo . |
| 3,643,690 | 2/1972 | Sarai ..................................... 137/587 |
| 3,738,384 | 6/1973 | Hall . |
| 3,765,435 | 10/1973 | Schlanzky . |
| 3,907,153 | 9/1975 | Mutty ................................ 141/59 X |
| 3,910,302 | 10/1975 | Sudhir . |
| 3,994,358 | 11/1976 | Smitley . |
| 3,994,360 | 11/1976 | Leibold . |
| 3,996,951 | 12/1976 | Parr et al. . |
| 4,000,828 | 1/1979 | Crute et al. . |
| 4,033,475 | 7/1977 | Evans . |
| 4,082,169 | 4/1978 | Bowles . |
| 4,095,609 | 6/1978 | Martin . |
| 4,185,651 | 1/1980 | Paulson . |
| 4,351,350 | 9/1982 | Crute . |
| 4,463,773 | 8/1984 | Kojima et al. . |
| 4,646,772 | 3/1987 | Bergsma . |
| 4,659,346 | 4/1987 | Uranishi et al. . |
| 4,670,749 | 6/1987 | Armstrong et al. ............... 141/59 X |
| 4,694,847 | 9/1987 | Szlaga ............................. 137/43 X |
| 4,700,864 | 10/1987 | Galles et al. . |
| 4,706,708 | 11/1987 | Fornuto et al. ...................... 137/588 |
| 4,724,861 | 2/1988 | Covert et al. ................... 137/588 X |
| 4,760,858 | 2/1988 | Szlaga ................................... 137/43 |
| 4,762,156 | 8/1988 | Rich ...................................... 141/46 |
| 4,779,637 | 10/1988 | Ubaldi . |
| 4,790,349 | 12/1988 | Harris .................................. 137/587 |
| 4,813,453 | 3/1989 | Jenkins et al. ....................... 137/580 |
| 4,815,436 | 3/1989 | Sasaki et al. ........................ 123/520 |
| 4,821,908 | 4/1989 | Yost . |
| 4,869,283 | 9/1989 | Oeffling et al. . |
| 4,872,439 | 10/1989 | Sonoda et al. . |
| 4,874,020 | 10/1989 | Bucci ..................................... 141/59 |
| 4,917,157 | 4/1990 | Gifford et al. ........................ 141/59 |
| 4,955,950 | 9/1990 | Seiichi et al. ......................... 141/46 |
| 4,966,299 | 10/1990 | Teets et al. .......................... 137/587 |
| 4,974,645 | 12/1990 | Johnson ................................ 141/59 |
| 5,014,742 | 5/1991 | Covert et al. ....................... 137/588 |
| 5,054,508 | 10/1991 | Benjey ................................... 137/43 |
| 5,054,520 | 10/1991 | Sherwood et al. ................. 137/587 |
| 5,065,782 | 11/1991 | Szlaga ................................... 137/43 |
| 5,099,880 | 3/1992 | Szlaga et al. ........................ 137/587 |

Primary Examiner—Ernest G. Cusick
Attorney, Agent, or Firm—Emch, Schaffer et al.

[57] ABSTRACT

The invention incorporates a high flow, pilot actuated pressure relief/rollover valve into a refueling vapor recovery system having a vapor vent line for recirculating vapor past the aspirator of a refueling nozzle and a nozzle seal for engaging a refueling nozzle in an airtight manner. All vapor of evaporative hydrocarbons created during the act of refueling are routed directly to an onboard storage canister.

9 Claims, 6 Drawing Sheets

REFUELING VAPOR RECOVERY SYSTEM

TECHNICAL FIELD

The present invention relates to fuel vapor recovery systems for motor vehicles.

BACKGROUND ART

The expulsion of hydrocarbon vapor during the act of refueling a motor vehicle has long been a pressing concern in the motor vehicle industry. During the past 20 years the United States Government, through the Environmental Protection Agency, and the various states have proposed increasingly stringent regulations designed to decrease the evaporative emission of hydrocarbons to the atmosphere. State and federal regulations, effective in 1991, require that all motor vehicles provide an onboard method of capturing hydrocarbon vapor displaced from an automobile fuel tank during the refueling process. The captured vapor must be stored on the vehicle for consumption by the engine as the vehicle is operated. The regulations further require that no hydrocarbon vapor be released to the atmosphere when the fuel cap is removed from the fill neck and the fuel nozzle is inserted into the fill neck during the act of refueling a vehicle.

Over the years, the motor vehicle industry has designed a variety of valves and vent systems which address some of the individual requirements for environmentally safe operation, such as improved fuel filler caps, rollover valves, and the like. The present invention provides a distinct improvement over these individual components by providing a comprehensive refueling vapor recovery system which allows fueling against a predetermined tank pressure and which vents all refueling vapor to a storage canister through an appropriate flow valve mounted in the vapor dome of the fuel tank. The present invention provides for the venting of all evaporative emissions and refueling vapor through the same valve and is in continuous use whether the motor vehicle is operative or being refueled.

DISCLOSURE OF INVENTION

In view of the above, and in accordance with the present invention, there is provided a refueling vapor recovery system which consists of a pilot-operated high flow rollover/relief valve which is tank mounted, a fill neck assembly which houses a nozzle seal and liquid seal funnel, and a vapor pressure vent line. The vapor pressure vent line includes a vent tube which is incorporated into the high flow valve and extends into the tank interior to a desired fuel level thereby functioning as a liquid-level sensing device. The vapor pressure vent line also includes a flow valve located in the fill neck below the nozzle seal. The vapor pressure vent line operates in conjunction with the fill neck cartridge to recirculate fuel vapor past the fill nozzle during the act of refueling. Most automatic fill nozzles utilize a pressure sensitive aspirator device to trigger the fuel nozzle off during operation. Any drop in vapor pressure which is triggered by an interruption in the vapor flow to the aspirator of the fuel nozzle will act to shut the fuel nozzle off. Thus, once the fuel level in the tank rises to a level which immerses the vent tube inlet, the vapor will discontinue circulating through the vapor pressure vent line, thus reducing the pressure at the aspirator, and the fuel nozzle will be shut-off, ending the act of refueling.

The present invention serves to combine the functions of a high flow tank pressure relief valve and a high flow rollover valve with refueling vapor recovery. Vapor present in the tank system or created during the refueling process is recirculated through the vapor pressure vent line and is also routed to the storage canister directly from the vapor dome of the fuel tank rather than out of the fill neck. The recirculation of the refueling vapor is utilized to control the operation of the automatic filler nozzle. Thus, the combination of all the above elements provides a vapor recovery system for motor vehicles which is effective in capturing the evaporative hydrocarbons created both during the act of refueling and normal vehicle operation and yet is simple in its design and low in cost.

Therefore, it is an object of the present invention to maximize the collection of evaporative hydrocarbon vapor created during the refueling of a motor vehicle and direct the collected vapor to an appropriate storage canister.

Further, it is an object of the invention to provide for the collection of hydrocarbon vapor through the same apparatus during the operation of a motor vehicle and the refueling of a motor vehicle.

It is yet another object of the invention to provide a flow path to the storage canister of sufficient capacity to allow all vapor being displaced by refueling or tank pressurization to escape without over pressurizing the fuel tank.

Yet another object of the invention is to prevent fuel from passing as a liquid to the storage canister.

Another object of this invention is to provide for refueling vapor recirculation as a control device for automatic refueling nozzles.

And a final object of the present invention is to prevent hydrocarbon vapor or liquid fuel from escaping to the atmosphere when the gas cap is removed from a pressurized tank and during the process of refueling that pressurized tank.

The present invention can be readily understood by reference to the accompanying drawings in view of the following detailed description of the best mode for carrying out the invention.

BEST MODE OF CARRYING OUT INVENTION

Figure 1:
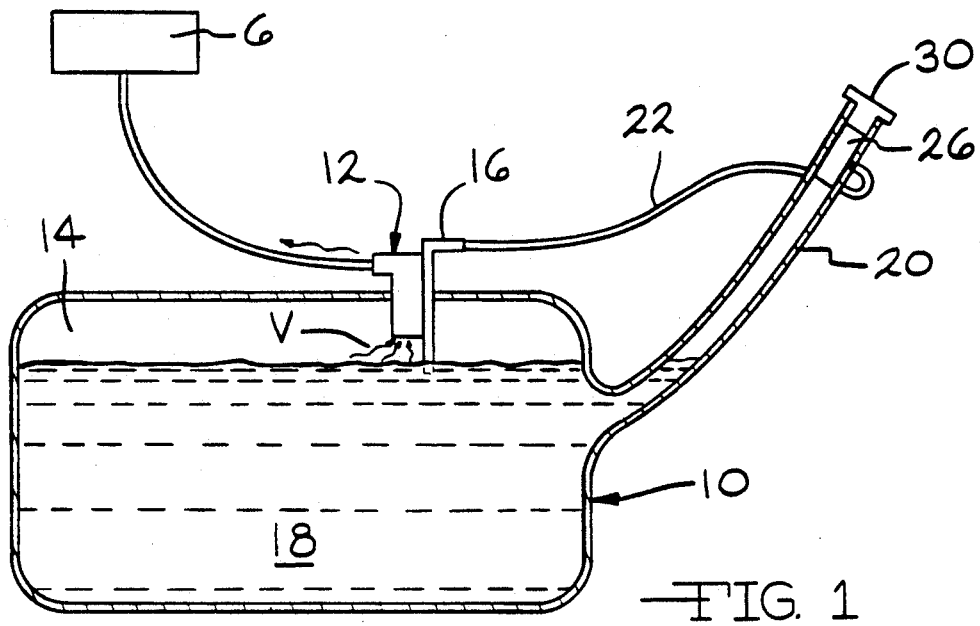
FIG. 1 is a schematic diagram of the vapor recovery system of the present invention as utilized with a full fuel tank.
Figure 3:
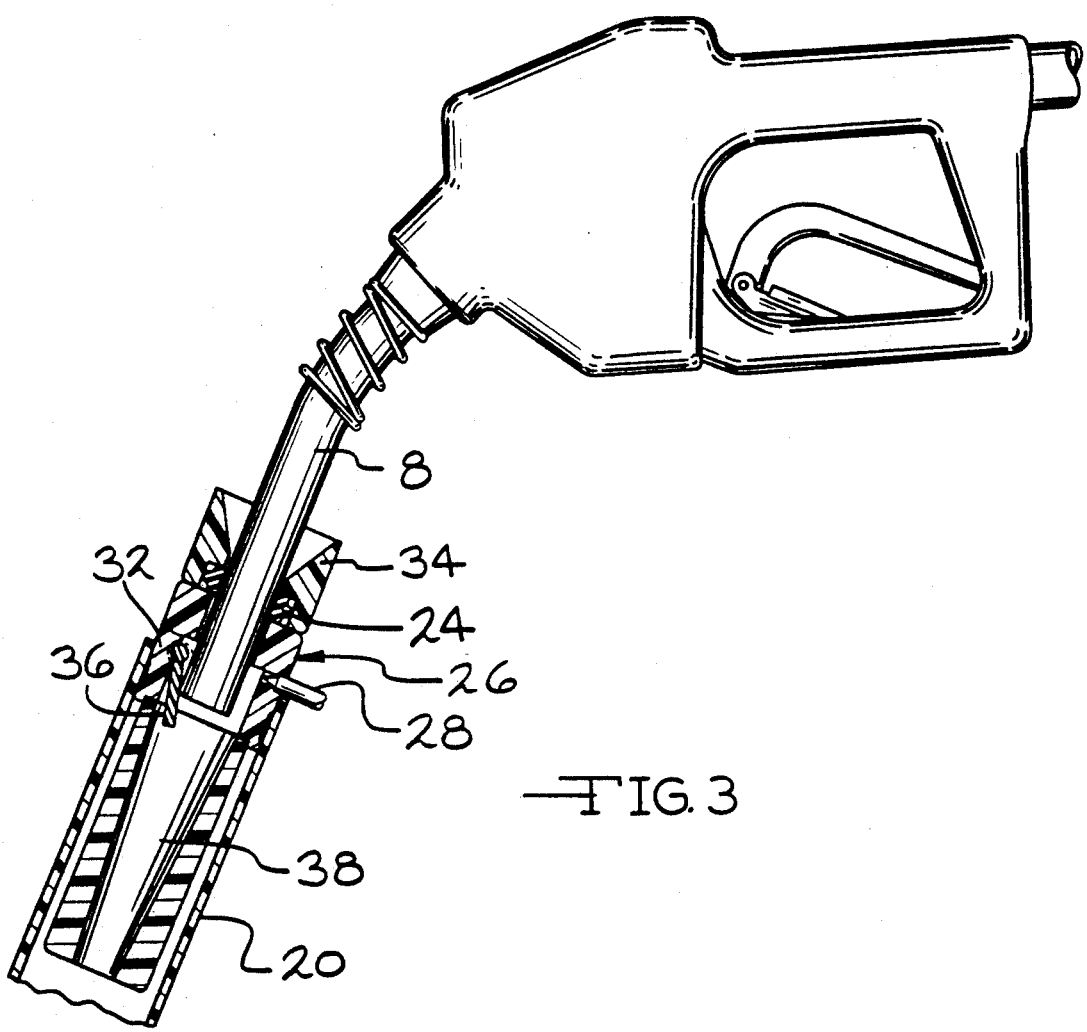
FIG. 3 is a detailed schematic of a preferred embodiment of the nozzle seal and liquid seal funnel of the vapor recovery system of the present invention.

Referring now to FIG. 1, the basic components which make up the vapor recovery system of the present invention are shown. These components will be described in detail in their preferred embodiment. However it is fully intended that, while the combination of these components produces the preferred embodiment of the invention, the individual components as described may be replaced by equivalent structures capable of performing the same functions. The present invention includes a tank pressure relief/rollover valve 12 which is mounted in the vapor dome 14 or top of a fuel tank 10. The valve 12 is a pilot actuated high flow valve which incorporates a vent tube 16 extending into the interior 18 of the fuel tank 10 to a depth equivalent to the desired maximum fill level for the tank 10. The vent tube 16 communicates with the fill neck 20 by a vent line 22 engaged with a vent valve 28 located in the fill neck 20 at a point proximate the nozzle seal 24 and liquid seal cartridge 26, as shown in FIG. 3. Further, as shown in FIGS. 1 and 3, the nozzle seal 24 and liquid seal cartridge 26 are designed to prevent vapor and pressure from escaping to the atmosphere when the gas cap 30 is removed and the fill nozzle 8 is inserted and removed. The fill neck 20 is topped off by a vacuum relief gas cap 30 which allows air to be taken into the tank system in the event of a fuel tank vacuum situation.

Figure 2:
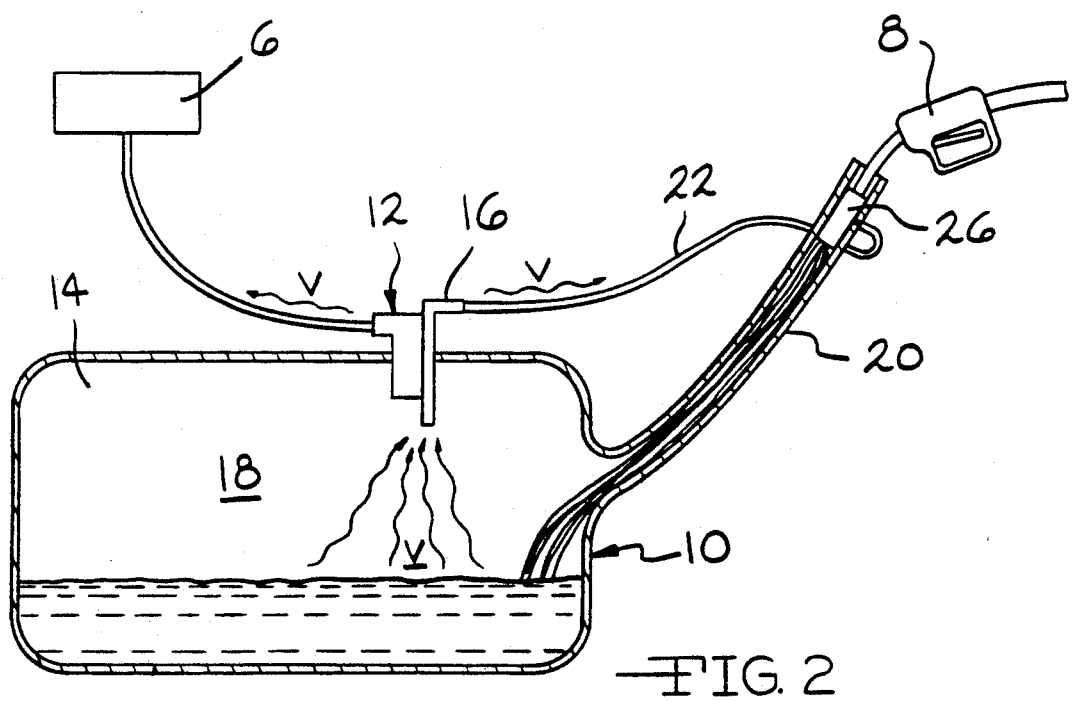
FIG. 2 is a schematic diagram of the vapor recovery system of the present invention as utilized with a fuel tank undergoing the process of refueling.

Referring now to FIGS. 2 and 3, the vapor recovery system of the present invention is shown in operation. As fuel is pumped into the fill neck 20, the fuel flows into the fuel tank 10 and vapor V is recirculated through the vent tube 16 incorporated in the high flow valve 12 through the vent line 22 to the vent valve 28 located in the fill neck 20 just below the nozzle seal 24. The vent valve 28 is positioned so that it is above the end of the fill nozzle 8 from which the fuel is being dispensed. The tank pressure will increase as fuel is added to the system until the pressure reaches a preset level or regulating pressure. Upon pressurizing to the regulating pressure, the high flow valve 12 fully opens and allows vapor V to flow to the storage canister 6, commonly a carbon canister. As fuel continues to be pumped into the tank system, the vapor V continues to recirculate through the vent tube 16 and simultaneously flow to the storage canister 6 through the high flow valve 12. The fuel level in the tank 10 will continue to increase until it reaches the preset "full" level which is established by the bottom of the vent tube 16 extending into the tank 10. Once the bottom of the vent tube 16 is immersed in liquid, the vapor V recirculation to the fill neck 20 is eliminated, thus reducing the vapor pressure at the mouth of the fill nozzle 8. Since most common fill nozzles 8 utilize a pressure sensitive automatic shut-off for the fuel flow, the drop in vapor pressure caused by the deletion of vapor recirculation will cause the fill nozzle 8 to discontinue supplying fuel. During normal operation, the nozzle 8 is then removed from the fill neck 20. A check valve 36 located in the fill neck cartridge 26 will close prior to the disengagement of the nozzle 8 from the nozzle seal 24, thereby retaining any vapor or liquid within the system after the nozzle 8 is removed.

The high flow valve 12 functions as a rollover valve as well as a pressure relief valve. Even when the tank system 10 is sealed and there is no refueling taking place, the high flow valve 12 will continue to monitor the vapor pressure within the tank 10. The high flow valve 12 will vent vapor V to the storage canister 6 if the tank pressure exceeds the regulating pressure or calibration point of the valve 12. The valve 12 will close if it becomes immersed in liquid, for instance during a vehicle rollover. If fuel or liquid is in contact with the valve 12, the valve 12 will close off all vents and passageways to the storage canister 6 and the atmosphere, thereby eliminating any potential leakage of fuel from the tank 10.

Referring to FIG. 3, the nozzle seal 24 and cartridge 26 preferably include a housing member 32 which is generally press fit into the open end of the fill neck 20. The housing member 32 usually creates a nozzle guide 34 which is intended to facilitate the insertion and removal of the fill nozzle 8. The housing member 32 also usually includes the nozzle seal 24 which is intended to circumvent the fill nozzle 8 with a generally airtight seal, thereby preventing the escape of hydrocarbon vapor or liquid to the atmosphere when the fill nozzle 8 is inserted through the nozzle guide 34. The cartridge 26 also includes a check valve 36, such as the trap door shown in FIG. 3, which in this embodiment is located at the bottom of the housing member 32 and which usually remains in the closed position. Insertion of the fill nozzle 8 into the fill neck 20 will force the check valve 36 open to allow the free flow of fuel into the tank system 10. The check valve 36 will return to its normally closed position before the fill nozzle 8 is removed from engagement with the nozzle seal 24 and will, therefore, prevent any vapor within the fuel tank 10 and fill neck 20 from circulating to the atmosphere while the gas cap 30 is removed from the fill neck 20. Alternatively, a check valve 36 such as a sealing trapdoor (not shown) can be located at a different position lower in the fill neck 20. The sealing trapdoor is activated by the flow of fuel against its inlet side and also remains in the closed position unless fuel flows against the inlet side and forces it open. If fuel is not flowing, the sealing trapdoor remains closed. The use of such a check valve 36 provides for pressure control within the tank system 10 and assists in preventing any undesirable pressure leakage from the system through the gas cap 30.

The cartridge 26 as preferably utilized in the present invention also includes a liquid seal funnel member 38 which extends from the vent valve 28 in the fill neck 20 down into the fill neck 20 toward the tank 10. The liquid seal funnel 38 progressively constricts the fuel flow down the fill neck 20 and prevents the circulation of any vapor up the fill neck 20 toward the fill nozzle 8. Since the vent valve 28 is engaged with the liquid seal funnel 38, the only vapor circulation allowed to reach the fill nozzle 8 and its pressure sensitive aspirator (not shown) is provided via the vent valve 28. Thus, proper regulation of the automatic shut-off feature of the fill nozzle 8 is achieved.

It should be noted that the embodiment of the nozzle seal 24 and cartridge 26 as shown in FIG. 3 is only one embodiment which may be adapted for use with the present invention. The nozzle seal and cartridge shown in U.S. Pat. No. 4,813,453 (the '453 patent) may also be incorporated into use with the present invention and the disclosure of the '453 patent is incorporated herein.

Figure 4:
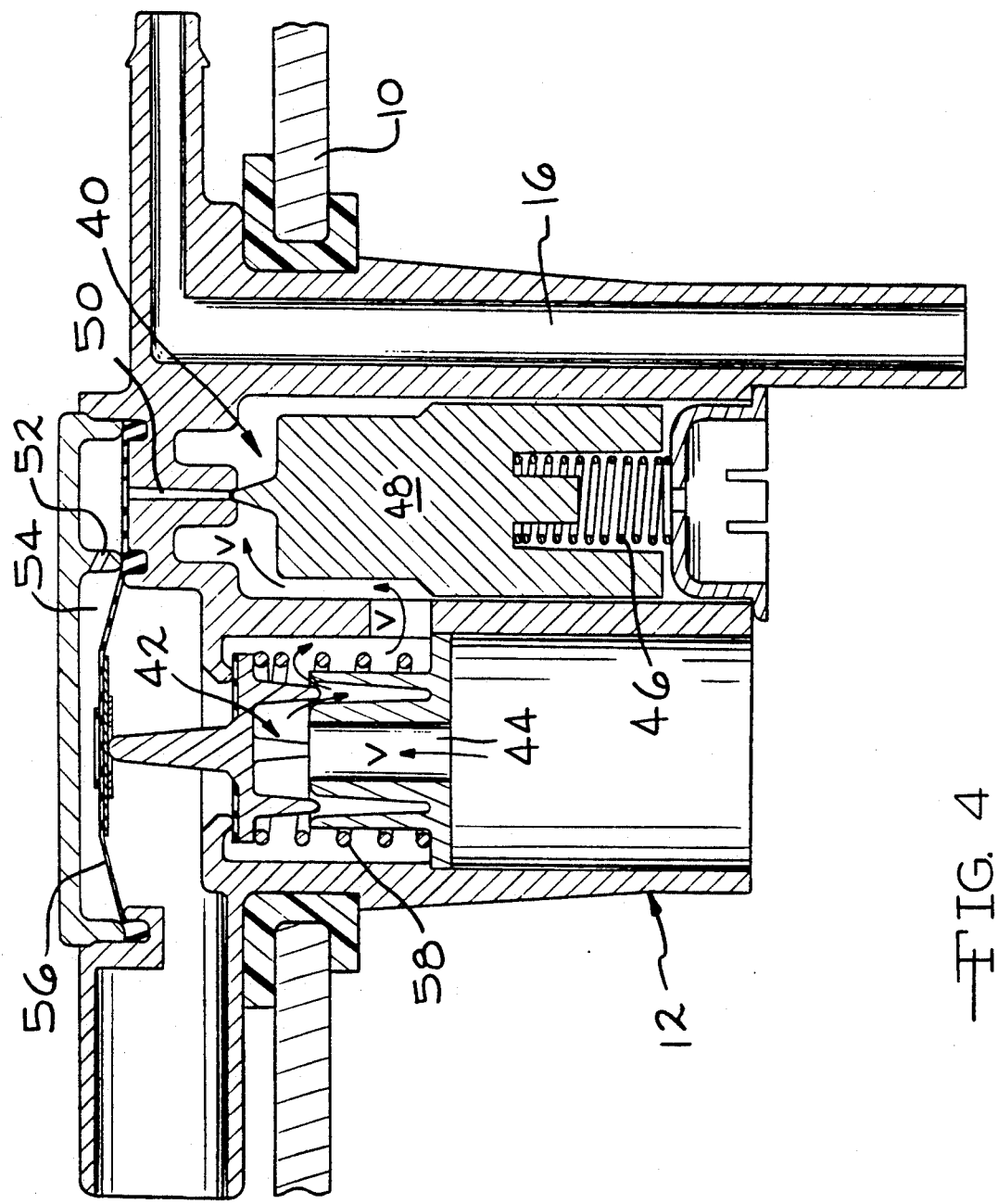
FIG. 4 is a cross-sectional view of the high flow pressure relief/rollover valve as used in the present invention.
Figure 5:
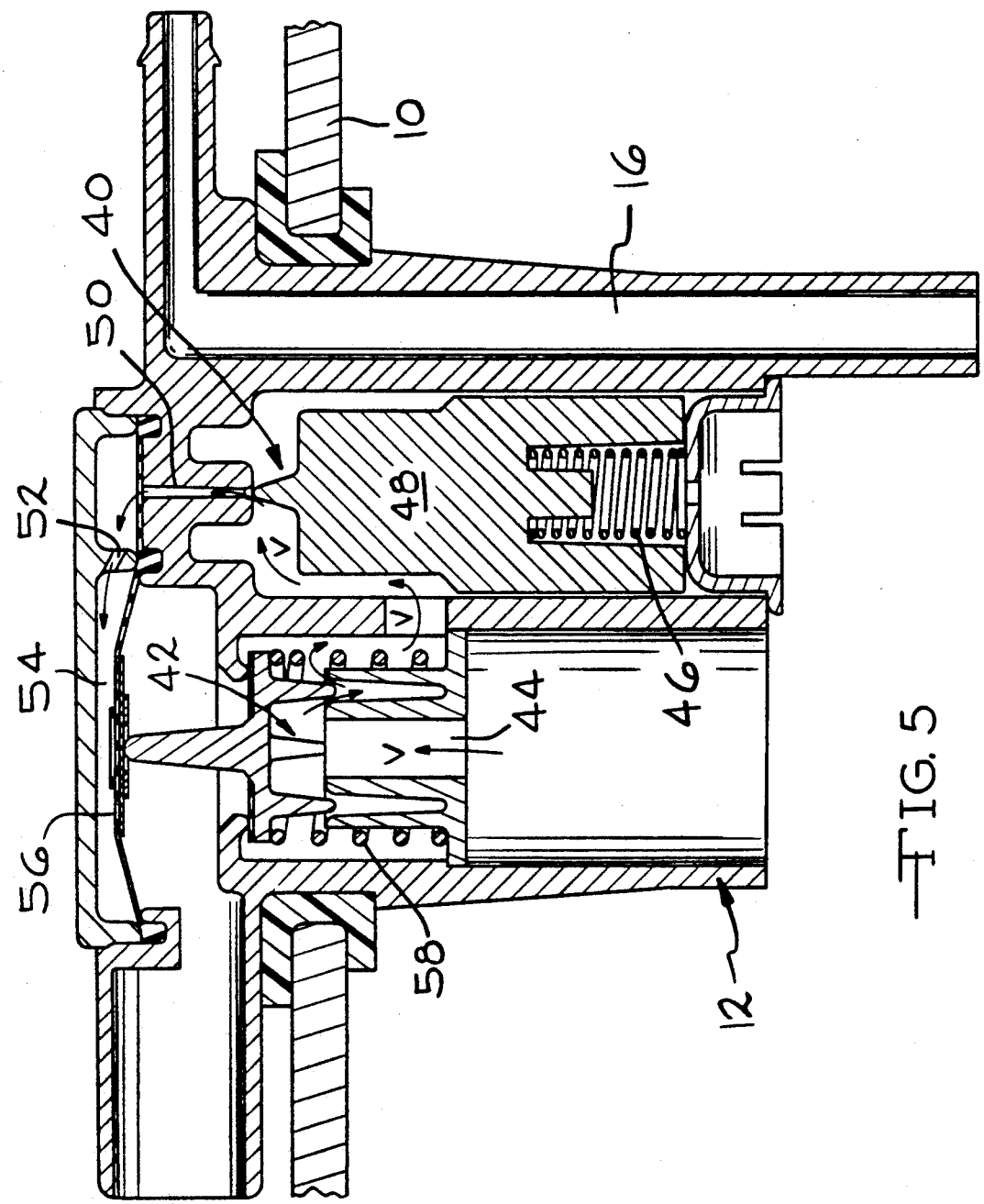
FIG. 5 is a view of the valve of FIG. 4 with the pilot valve in the open position.
Figure 6:
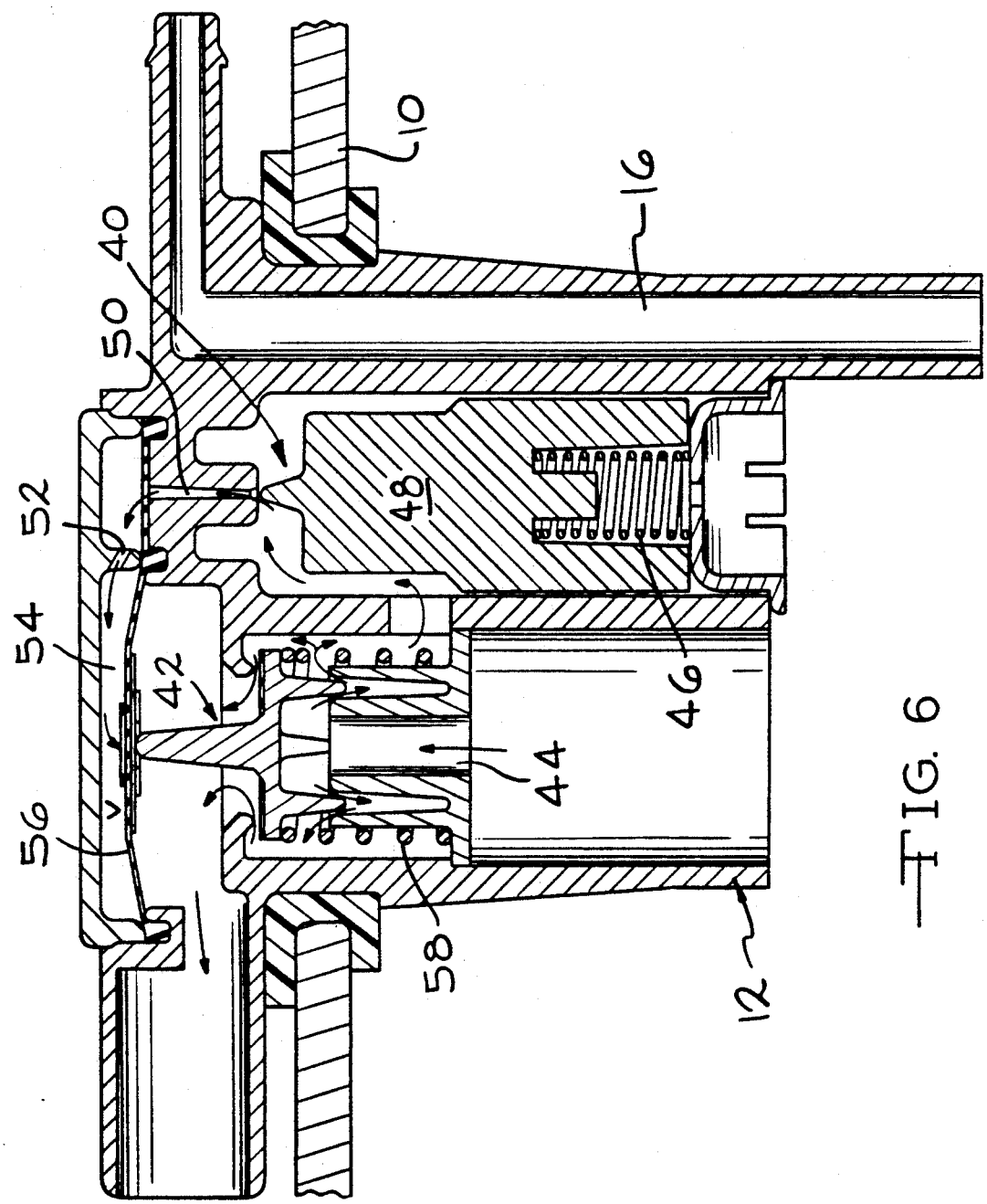
FIG. 6 is a view of the valve of FIG. 4 with both the pilot valve and the high flow valve in the open position.

Referring to FIGS. 4, 5 and 6 the preferred mode of the high flow relief/rollover valve 12 as incorporated with the present invention is shown in detail. The valve 12 includes a pilot valve or spring biased float valve 40 and a spring biased high flow valve 42 in communication with the pilot valve 40. The pilot valve 40 is normally biased in the open position and the high flow valve 42 is normally biased in the seated or closed position as shown in FIG. 5. As the vapor pressure within the fuel tank 10 increases, the pressure acts on the pilot valve 40 through the flow orifice 44 which is open to the tank pressure P. With the pilot valve 40 biased open, the vapor pressure passes through the vapor port 50 and communication port 52 to a diaphragm chamber 54 as shown in FIG. 5. If the pressure P continues to increase in the tank system the pressure P will also continue to increase in the diaphragm chamber 54 until the pressure exerted against the surface area of the diaphragm 56 eventually overcomes the force bias of the high flow valve spring 58, thereby forcing the high flow valve 42 to unseat, allowing high pressure vapor to escape to the storage canister 6 as shown in FIG. 6. Once the vapor pressure within the fuel tank 10 is reduced to the preset regulation pressure, the force bias of the spring 58 for the high flow valve 42 will overcome the force of the vapor pressure P and cause the valve 42 to close, thereby sealing off the storage canister 6. The valve 12 shown in FIGS. 4, 5 and 6, further acts as a rollover valve. As shown in FIG. 4, if the valve 12 is immersed in liquid the float 48 will assist the bias member 46 to close the pilot valve 40, thereby sealing the vapor port 50, shutting off pressure distribution to the diaphragm 56. Pressure will bleed down within the diaphragm chamber 54 through a small pinhole (not shown) located in the diaphragm 56, thereby allowing the spring 58 bias to close the high flow valve 42 and seal the tank system from any possibility of a fuel spill.

Figure 7:
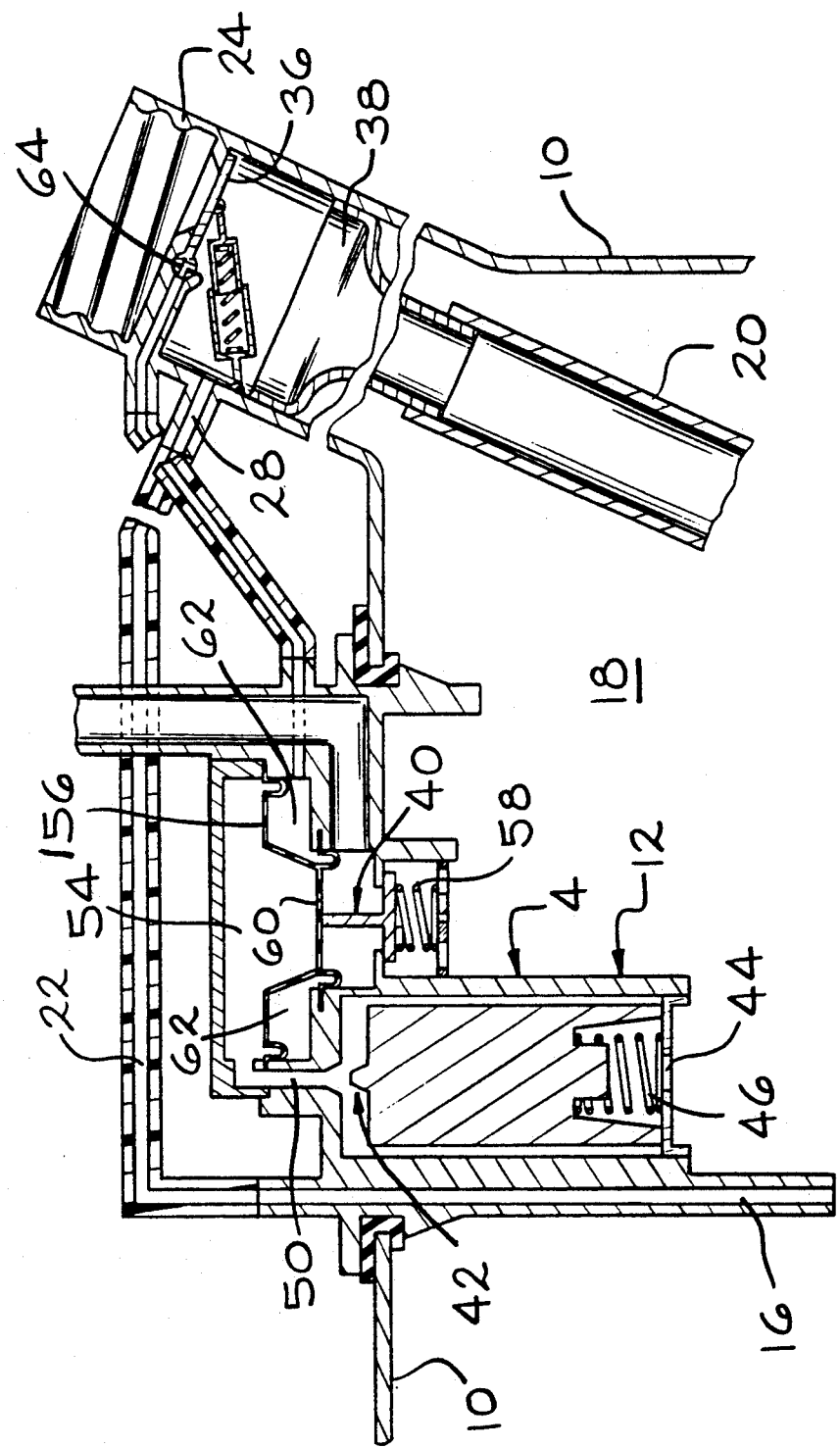
FIG. 7 is a cross section schematic of an alternative embodiment of the refueling vapor recovery system of the present invention.

Referring now to FIG. 7, an alternative embodiment of the best mode of the present invention is shown. The alternative embodiment continues to incorporate the vent tube 16 in communication via a vent line 22 to a vent valve 28 located in the fill neck 20 immediately below the check valve 36 of the nozzle seal 24. The alternative embodiment further continues to incorporate the high flow pilot actuated relief/rollover valve 12 similar to that shown in FIGS. 4, 5 and 6. However, the valve 12 is modified to include a second cavity 62 in communication with a rotational valve 64 that is interconnected with and operated in conjunction with the check valve 36 of the nozzle seal 24, in this case a trapdoor assembly. When the check valve 36 is closed, the rotational valve 64 is open to the tank side of the fill neck 20, thus allowing vapor pressure P within the tank 10 to be applied to the second cavity 62 through a secondary pressure line 66. The tank pressure P is, at the same time, being applied to the diaphragm chamber 54 through the pilot valve 40 and communication port 50 as usual. Since the tank pressure P is applied to the entire surface area of the diaphragm 156 through the diaphragm chamber 54 and a portion of the opposed surface area of the diaphragm 156 through the second and opposed cavity 62, the effective surface area utilized to operate the high flow valve 42 is greatly reduced. Thus, the reduced effective area of the diaphragm 156 will require a much higher pressure level to overcome the force bias of the high flow valve spring 58 to open the high flow valve 42 and allow a high flow of vapor to the storage canister 6.

When the check valve 36 is opened, for instance by insertion of a fill nozzle 8, the rotational valve 64 moves to a second position which communicates with the atmosphere and causes the pressure in the second cavity 62 to be atmospheric. The tank pressure continuing to operate against the larger surface area of the diaphragm 156 is opposed only by atmospheric pressure and the high flow valve 42 will therefore unseat at a much lower tank pressure. Thus, the alternative embodiment of the present invention will allow for a two-stage pressure regulation of the tank system. A low pressure for refueling and a higher pressure for motor vehicle operation.

The foregoing description of the best mode for carrying out the invention is presented for instructional purposes and is not intended to be limiting upon the scope and content of the following claims.

We claim:

1. An apparatus for facilitating the control of vapor flow within the fuel system of a motor vehicle, such fuel system including a tank member defining a fuel storage chamber and a fill neck member engaged with said tank member and in communication with said fuel storage chamber, said apparatus comprising, in combination:

a vapor pressure relief valve engaged with the tank member and in communication with the fuel storage chamber, said relief valve including an outlet valve for venting fuel vapor from the fuel storage chamber, said outlet valve being normally biased to the closed position and a pilot valve for actuating said outlet valve in communication with said outlet valve, said pilot valve being normally biased in the open position;

a vent tube engaged with the tank member such that one end of said vent tube extends into the fuel storage chamber to a position equivalent to the maximum desired fill level of the fuel storage chamber, the opposed end of said vent tube being engaged with the fill neck member, whereby said vent tube provides a fuel vapor flow path between the fuel storage chamber and the fill neck;

and a cartridge member positioned in the fill neck, at a point proximate the engagement of said vent line with the fill neck, wherein said cartridge member engages a fuel nozzle upon insertion of the fuel nozzle into the fill neck to prevent fuel vapor from releasing to the atmosphere during the act of refueling;

whereby said cartridge member, said vent tube, and said vapor pressure relief valve operate in coordination during the act of refueling the tank to prevent the release of fuel vapor to the atmosphere and relieve the buildup of fuel vapor within the fuel system.

2. The apparatus of claim 1, further including a vacuum relief gas cap for engaging and sealing the fill neck between acts of refueling to prevent the release of vapor pressure to the atmosphere.

3. The apparatus of claim 1, further including a means for biasing said outlet valve in the closed position wherein said outlet valve seals fuel vapor within the fuel system until the pressure within the fuel system increases to a level sufficient to exert a predetermined force against said bias means to open said outlet valve and vent the fuel vapor from the fuel storage chamber.

4. The apparatus of claim 3 further including a float member engaged with said pilot valve, said float member having sufficient buoyant force when immersed in liquid to force said pilot valve into a sealed or closed position thereby preventing the buildup of vapor pressure against said bias means.

5. The apparatus of claim 4, wherein said bias means includes a pressure bleed orifice, wherein the vapor pressure exerted against said bias means gradually lessens after said pilot valve has closed and sealed off further vapor flow to said bias means, and said bias means operates as the vapor pressure is reduced to close said high flow valve, thereby effectively sealing said outlet valve and preventing further vapor flow to the storage canister.

6. The apparatus of claim 1, wherein said cartridge member includes a nozzle guide and nozzle seal for engaging the outer circumference of a fuel nozzle inserted therein with a substantially airtight seal; and a check valve biased in the closed position to prevent fuel vapor from circulating to the atmosphere from said fill neck, said check valve being operable to open only upon insertion of the fuel nozzle through said nozzle seal.

7. The apparatus of claim 6 further including a liquid seal funnel member positioned in the fill neck and extending from a point proximate said vent tube engagement with the fill neck toward the tank member and having a progressively narrowing cross-section such that the fuel flow down such fill neck is progressively restricted, said funnel member further acting to prevent recirculation of vapor within such fill neck toward such fill nozzle, thereby isolating vapor circulation around such fill nozzle to that vapor supplied from said vent tube.

8. The apparatus of claim 1, wherein said outlet valve includes a valve body defining a high flow valve outlet having a valve seat surrounding said outlet and a valve member for engaging said valve seat and closing said outlet, a diaphragm member engaged to said valve seat, a diaphragm chamber in communication with said diaphragm member and said pilot valve, a resilient means in communication with said diaphragm member in opposition to said diaphragm chamber, whereby said resilient member maintains said valve member engaged with said valve seat and said pilot valve directs vapor pressure to said diaphragm chamber until the forces applied by the vapor pressure against said diaphragm members overcomes the forces applied by said resilient member in opposition and said valve member disengages from said valve seat to open said outlet.

9. The apparatus of claim 8 further including a second diaphragm chamber, smaller in volume than said first diaphragm chamber, in communication with a portion of the surface area of said diaphragm member in opposition to said first diaphragm chamber, a pressure line engaged with said second diaphragm chamber and a rotational valve located in the fill neck proximate said cartridge member, whereby said rotational valve directs fuel system vapor pressure into said second diaphragm chamber during motor vehicle operation and opens said pressure line and second diaphragm chamber to atmosphere during the act of refueling.

* * * * *